US006152165A

United States Patent [19]

Fukuda

[11] Patent Number: 6,152,165

[45] Date of Patent: Nov. 28, 2000

[54] VALVE CORE MOUNTING AND DISMOUNTING TOOL

[75] Inventor: Takanori Fukuda, Shimizu, Japan

[73] Assignee: Alma Trading Incorporated, Shimizu, Japan

[21] Appl. No.: 09/505,024

[22] Filed: Feb. 16, 2000

[30] Foreign Application Priority Data

| | | | |
|---|---|---|---|
| Mar. 3, 1998 | [JP] | Japan | 10-67724 |
| Feb. 22, 1999 | [JP] | Japan | 11-89537 |

[51] Int. Cl.[7] F16K 43/00; B60C 25/18; B60C 29/04

[52] U.S. Cl. 137/315.41; 137/223; 137/234.5; 137/315.11; 137/454.5; 29/221.5; 81/124; 81/125; 81/177.85; 152/427; 152/429; 251/291; 403/328

[58] Field of Search 81/176.15, 177.85, 81/124.2, 125; 137/223, 234.5, 315.41, 315.11, 319, 454.5; 251/291, 292, 293; 29/221.5, 221.6; 152/427, 429, 431; 403/328

[56] References Cited

U.S. PATENT DOCUMENTS

| | | | |
|---|---|---|---|
| 2,084,200 | 6/1937 | Karlson | 137/319 |
| 2,187,838 | 1/1940 | Penick et al. | 137/319 |
| 2,320,042 | 5/1943 | McMahan | 137/319 |
| 2,851,295 | 9/1958 | Chaffee | 81/177.85 |
| 3,100,335 | 8/1963 | Lea | 29/221.5 |
| 3,208,133 | 9/1965 | Morton | 29/221.5 |
| 3,561,090 | 2/1971 | Fritch | 29/221.5 |
| 3,840,967 | 10/1974 | Olson | 29/221.6 |
| 3,935,713 | 2/1976 | Olson | 29/221.6 |
| 4,420,012 | 12/1983 | Astrom | 137/319 |
| 4,528,735 | 7/1985 | Eastridge et al. | 29/221.5 |
| 4,579,476 | 4/1986 | Post | 403/322 |
| 4,645,372 | 2/1987 | Suzuki | 403/325 |
| 4,807,343 | 2/1989 | Wadsworth | 29/221.5 |
| 4,899,780 | 2/1990 | Astrom | 137/319 |
| 5,097,580 | 3/1992 | Story | 29/221.5 |
| 5,746,416 | 5/1998 | Paylor | 251/291 |
| 5,794,644 | 8/1998 | Paylor | 251/292 |
| 5,803,108 | 9/1998 | Schuessler, Jr. et al | 137/315.41 |
| 5,950,654 | 9/1999 | Paylor | 251/292 |

*Primary Examiner*—George L. Walton
*Attorney, Agent, or Firm*—Donald E. Schreiber

[57] ABSTRACT

A tire air valve (core) mounting and dismounting tool 20 includes a tool head portion 21, a shank portion 22 and a grip portion 23. The tool head portion 21 has a slot 32 for seizing and holding a valve core head portion 16, an axial bore 33 for accepting a valve core shaft portion 14 and its enlarged end 14*a*. The tool head portion 21 also has annular groove 34 formed along a cylindrical peripheral surface thereof. Balls 36 are retained in second bores 35 which are open to the annular groove 34 and also communicate with the axial bore 33 through openings 37 of a reduced diameter to allow the balls 36 to partially protrude into the axial bore 33. A coil spring 38 is anchored and fastened in the annular groove 34 to act to normally bias the ball 36 radially inwards and leave the balls 36 protruding into the axial bore 33. When the balls 36 are hit and pushed down by the valve core shaft's enlarged end 14*a*, the elasticity of the coil spring 38 allows the balls 36 to move radially outwards, permitting the valve core shaft end 14*a* to move deeper beyond the balls 36 and then permitting the balls 36 to restore their biased state, thereby holding the valve core shaft end 14*a* against moving back. Thus, the valve core is caught by the tool.

7 Claims, 6 Drawing Sheets

VALVE CORE MOUNTING AND DISMOUNTING TOOL

TECHNICAL FIELD

The present invention relates to a tire valve (core) mounting and dismounting tool and, more particularly, to an improved tyre valve (core) mounting and dismounting tool that is capable of removing from, and attaching to, a valve casing a valve body portion, commonly called a "valve core", with easiness and with reliability, and yet with a single hand, for a tire air valve, regardless of types of vehicle tires in which such tire air valves may have been mounted.

BACKGROUND ART

A tire air valve is mounted or installed into a tire for every vehicle, e. g., bicycles, motor cycles and automobiles including a commercial vehicle or truck, a motor bus and a passenger car. Such a valve commonly includes a casing in the form of a tubular or hollow cylindrical body that is a portion secured into a tire, and a valve "core" or body portion which when received in place in the tubular casing provides a conventional air valve mechanism and its pressure air inlet and closure functions.

To provide these functions and the air valve mechanism, the valve core is typically provided with an air inlet passage formed in a space between a tubular part with both ends open and a shaft passing through the tubular part coaxially therewith. The shaft has a flange secured thereto and is spring biased in the tubular part so that the flange normally closes one end (on the side proximal to the tire interior) air tight. The tubular part is associated with a head portion, called a "valve core head" portion, at the side distal to the tire interior, through which air is led from a pneumatic pump. The valve core shaft portion past the tubular part extends through and protrudes from the head portion and has a round and somewhat enlarged end face at its top or foremost end. When the shaft is pushed with a force applied onto that enlarged end surface, the shaft is moved against the spring bias relative to the tubular part that is fixed in position to the valve tubular casing to provide an opening between the closing flange and the tubular part, thereby establishing fluid communication of the air inlet passage with the tire or tire tube interior.

To ease assembling and disassembling the valve, the tubular valve casing is formed with a threaded inner surface and the valve core is provided with a threaded outer surface typically on the valve core head portion so that these two surfaces may be in mesh or interlocked with each other. Therefore, tire air valves for vehicle tires, regardless of types of the tyres in which they are loaded, commonly have a design such that screwing the valve core into the tubular casing may assemble the valve, i. e., make the valve core assume its operative position, and unscrewing the valve core from the tubular valve casing may disassemble the valve, i. e., may detach the valve core from the casing. With the valve assembled, the entire valve core including the head portion and the portion of the shaft that protrudes from the head portion must be accommodated within the tubular casing in order to protect it from any damaging external force.

Needs arise to disassemble or dismount and then to assemble or mount again a tire air valve of design as described. One situation that requires a tire air valve to be disassembled is, suffice to say, when its valve core is broken and needs to be replaced with a new valve core. Another situation imposing the requirement somewhat unique is when it is desired to inject a tire life extending (puncture preventive) liquid agent or component into a tire, conveniently through a tire air valve as mentioned above.

When a need arises to detach the valve core from the tubular casing in the tire in such a situation, use has so far been commonly made of a tool with a shaft or shank formed at its top with a slot or recess simply designed to allow the valve core head portion to be picked or pinched, requiring the user or operator to use both hands. It has been found that such conventional tools are not only inconvenient because of necessitating both hands in accomplishing an operation whereby a valve core is unscrewed from or screwed into its valve tubular casing. They have also been found to be unreliable even with considerable skill. From such a tool the valve core may very often come off and fall by gravity.

It must also be noted that especially for a commercial vehicle or a motor bus which employs a double type tire on each of its rear tyre wheel, its outer part tire has a tire air valve arranged to face inwards and yet to lie close to the tire wheel. As a result, the space open to the operator's operation in such a vehicle is quite limited and so narrow that even the operator's hands alone cannot be easily admitted, thus making the operator's two hand operation extremely difficult.

To make matters worse, tires for automobiles entail a specified air pressure that is considerably elevated. Thus, during a valve core detaching—mounting operation, air blows intensively from the tire air valve even for a moment, making it difficult even to keep the valve core retained on the tool. Rather, it has often be the case that a valve core comes to be blown off by the high pressure air blow from the valve, and eventually be lost. Such incidences are especially salient with tire air valves in the tires on automobiles such as commercial vehicles or motor buses in which the air pressure is even more increased.

DISCLOSURE OF INVENTION

It is accordingly an object of the present invention to provide an improved tire valve (core) mounting and dismounting tool which enables a valve core to be mounted into and dismounted from its tubular casing mounted in a vehicle tire, easily and reliably, and even with a single hand.

It is another object of the present invention to provide an improved tire valve (core) mounting and dismounting tool that is operable easily and reliably in a screwing and an unscrewing operation for a tyre air valve while enduring or withstanding a high pressure air blow from the tyre in which the valve is mounted.

It is a further object of the present invention to provide an improved tire valve (core) mounting and dismounting tool that is applicable to air valves with casings mounted in tires of such vehicles as commercial vehicles and motor busses.

Briefly stated, the present invention is directed to a tire valve (core) mounting and dismounting tool for a tire air valve having a tubular casing mounted in a vehicle tire and a valve core which is screwed into the tubular casing to form the tire air valve and is unscrewed for removal from the tubular body and to dismount the tire air valve, the valve core having a valve core head portion and a valve core shaft portion that extends through and protrudes from the valve core head portion and has a round enlarged shaft end.

An improved tire air valve (core) according to the present invention comprises a tool head portion, a tool shank portion, and a tool grip portion. The said tool head portion is formed at its top or foremost end with a slot for seizing and holding the valve core head portion in a snug fit. The said tool head portion also has:

a substantially cylindrical axial bore formed coaxially of the said tool head portion for receiving the said valve core shaft portion and accepting the said round enlarged shaft end thereof in a snug fit, this axial bore being open to the said slot;

an annular recess formed along a substantially cylindrical peripheral surface of the tool head portion;

a second bore formed in the tool head portion so as to extend substantially radially outwards thereof and to be open to the said annular recess, and a ball means slidably received in the said bore, the said second bore being in communication with the said axial bore through an opening that is smaller in diameter than the said ball means; and a spring means anchored and fastened in the said annular recess for normally biasing the said ball means substantially radially inwards of the tool head portion to hold the said ball means partially protruding out of the said second bore into the said axial bore through the said opening, the said spring means having an elasticity sufficient to permit the said ball means when hit and pushed down by the enlarged round shaft end of the said valve core shaft portion moving past the said slot and inside of the said axial bore to be pushed thereby radially inwards to move in the said second bore and completely out of the said axial bore and yet to be retained in the said second bore by the said spring means.

The elasticity of the said spring means is also such as to force the enlarged round end of the said valve core shaft portion to move deeper in the said axial bore beyond the said ball means and then to allow the said ball means to restore its biased state as set forth and thereby to act to hold the said enlarged shaft end against moving back.

Specifically, the said second bore may comprise a plurality of second bores and the said ball means may then comprise a plurality of substantially spherical balls which is accepted in the said second bores, respectively.

According to one preferred form of the invention, the said spring means comprises a spring in the form of a character C.

According to an alternative, even more preferred form of the present invention, the said spring means comprises a coil spring having a plurality of turns with a number of turns selected from two to four.

In a simple and yet advantageous form of embodiment of the invention, the said second bore comprises a pair of second bores disposed substantially diametrically opposite to each other about a longitudinal axis of the said tool head portion, and the said ball means then comprises a pair of spherical balls which are accepted in the two second bores, respectively.

It has been found that a tyre valve (core) mounting and dismounting tool when constructed as described above enables a valve core to be mounted into and dismounted from its tubular casing mounted in a vehicle tire, easily and reliably, and even with a single hand. The tool has also been found to be operable easily and reliably in a screwing and an unscrewing operation for a tyre air valve while enduring or withstanding to a high pressure air blow from the tyre in which the valve is mounted. The tool has also been found to be usable with air valves with casings mounted even in tires of such vehicles as commercial vehicles and motor busses.

These and other features, objects and advantages of the present invention will become more readily apparent to those of ordinary skill in the art from the following detailed description of the preferred forms of embodiment thereof as illustrated in the various drawing Figures.

BRIEF DESCRIPTION OF DRAWINGS

In the accompanying drawings.

SPECIFIC DESCRIPTION (Best Mode for Carrying Out the Invention)

Figure 1:
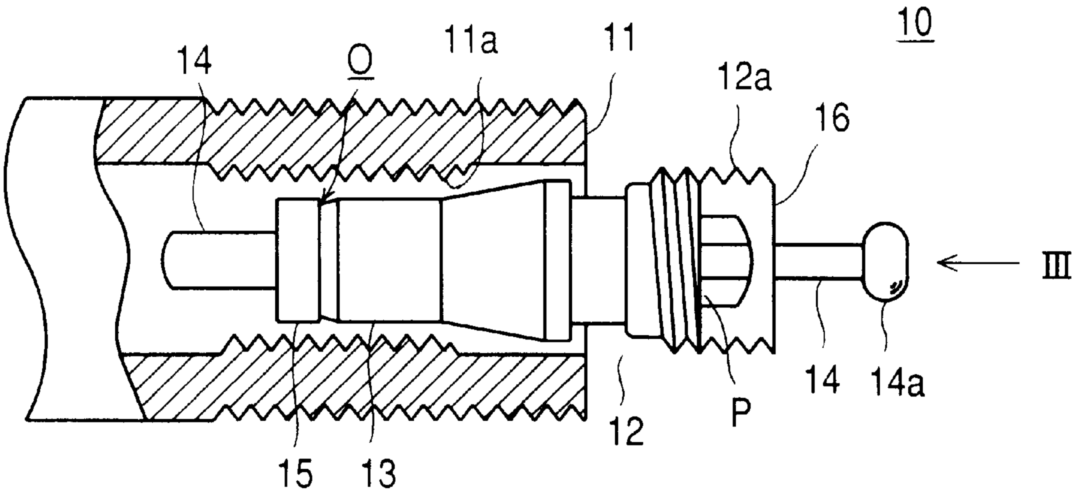
FIG. 1 is a first side view illustrating a valve core, taken with a longitudinal cross sectional view of its tubular casing, in a typical design of tire air valves to which a tire valve (core) mounting and dismounting tool according to the present invention is applicable.
Figure 2:
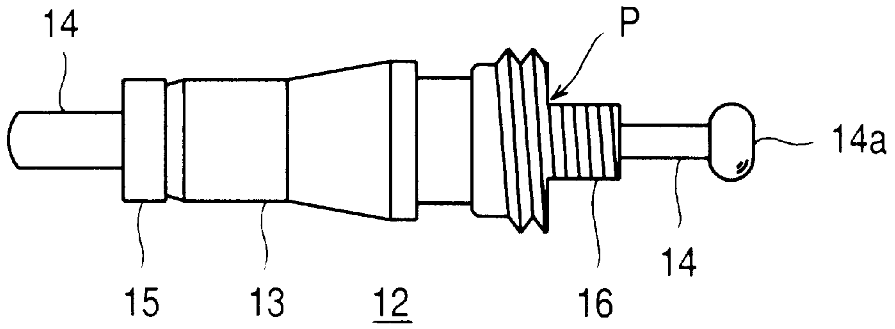
FIG. 2 is second side view of the valve core shown in FIG. 1.
Figure 3:
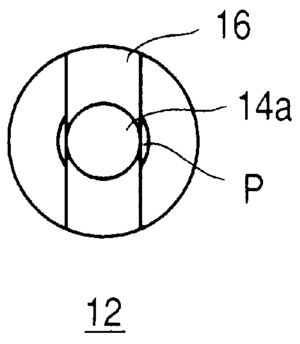
FIG. 3 is a plan view of the valve core shown in FIG. 1 as viewed from the direction of arrow III.

Referring to FIGS. 1 to 3, mention is first made of a tire air valve that is installed into a tire for every vehicle, e. g., bicycles, motor cycles and automobiles including a commercial vehicle or truck, a motor bus and a passenger car. Such a valve, denoted by general reference 10, commonly includes a casing 11 in the form of a tubular or hollow cylindrical body that is a portion secured into a tire (not shown), and a valve core or body portion 12 which when received in place in the tubular casing 11 provides a conventional air valve mechanism and its pressure air inlet and closure functions.

To provide these functions and the air valve mechanism, the valve core 12 is typically provided with an air inlet passage P formed in a space between a tubular part 13 with both ends open and a shaft 14 that passes through the tubular part 13 coaxially therewith. The shaft 14 has a flange 15 secured thereto and is spring biased in the tubular part 13 so that the flange 15 normally closes one end (on the side proximal to the tire interior) air tight. The tubular part 13 is associated with a head portion 16, called a "valve core head" portion, at the side distal to the tire interior, through which air is led from a pneumatic pump (not shown). The valve core shaft portion 14 past the tubular part 13 extends through and protrudes from the head portion 12 and has a round and somewhat enlarged end surface 14*a* at its top. When the shaft 14 is pushed with a force applied onto that round enlarged end surface 14*a*, the shaft 14 is moved against the spring bias relative to the tubular part 13 that is fixed in position to the valve tubular casing 11 to provide an opening as indicated by the arrow 0 between the closing flange and the tubular part, thus to establish fluid communication of the air inlet passage P with the tire or tire tube interior.

To ease assembling and disassembling the valve 10, the tubular valve casing 11 is formed with a threaded inner surface 11*a* and the valve core 12 is provided with a threaded outer surface 12*a* typically on the valve core head portion 16 so that these two surfaces 11*a* and 12 may come into and out of mesh with each other. Thus, tire air valves 10 for vehicle tires. regardless of types of the tyres in which they are loaded, commonly have a design such that screwing the valve core 12 into the tubular casing 11 may assemble the valve 10, i. e., make the valve core 12 assume its operative position, and unscrewing the valve core 12 from the tubular valve casing 11 may disassemble the valve 10, i. e., may detach the valve core 12 from the casing 11. With the valve 10 assembled, the entire valve core 12 including the head portion 16 and the portion of the shaft 14 that protrudes from the head portion 16 must be accommodated within the tubular casing 11 in order to protect it from any damaging external force.

Figure 4A:
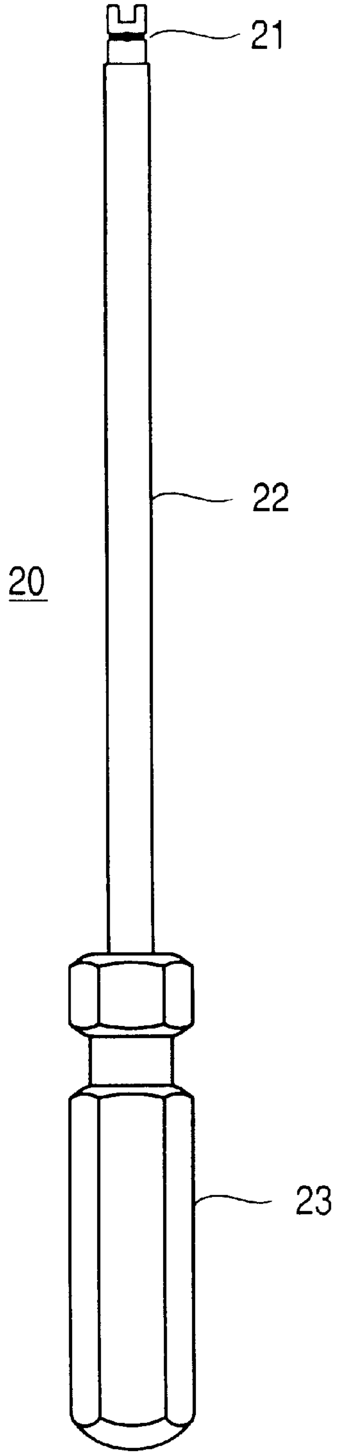
FIGS. 4A and 4B are a front and a side elevational view, respectively, that illustrate a tire valve (core) mounting and dismounting tool according to the present invention.
Figure 4B:
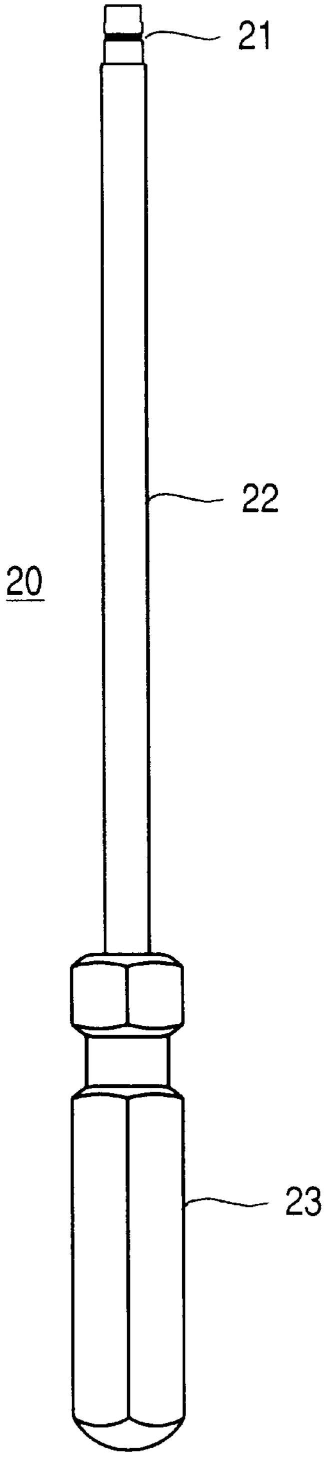
Figure 5A:
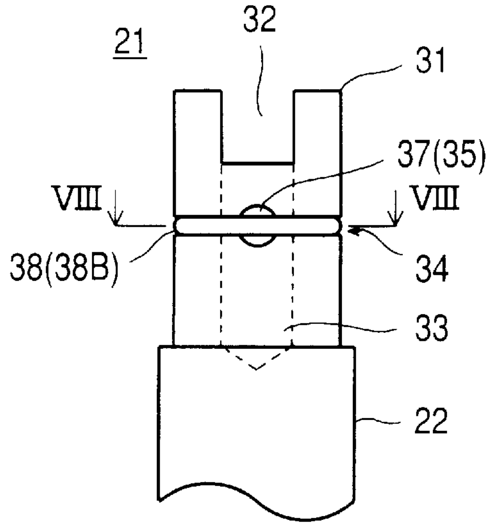
FIGS. 5A and 5B are an enlarged front and an enlarged side view, respectively, that illustrate a tool head portion extending from a tool shank portion, of a tire valve (core) mounting and dismounting tool according to the present invention.
Figure 5B:
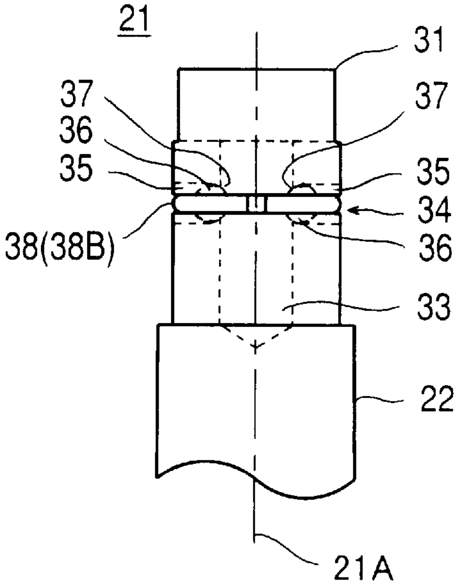

FIGS. 4A and 4B depict an appearance of an improved tire valve (core) mounting and dismounting tool as indicated by general reference numeral 20, which is designed to be applicable to a tire valve core 10 as described above. The tool 20 is shown to include a tool head portion 21, a tool shank portion 22, and a tool grip portion 23. These separate portions 21, 22 and 23 are secured together and coaxially with each other. It can be seen that the tool 20 resembles a conventional screw driver except for a unique construction and configuration, as described below in detail, of the tool head portion 21 provided at the top end of the shaft portion 22 held by the grip portion 23.

Figure 6:
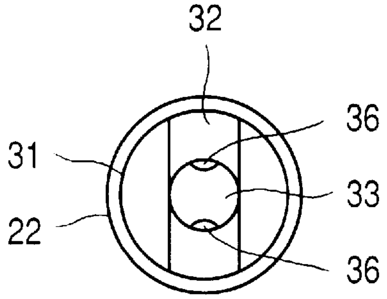
FIG. 6 is a top plan view that illustrates the tool head portion and the tool shank portion of the tyre valve (core) mounting and dismounting tool shown in FIGS. 5A and 5B.
Figure 7:
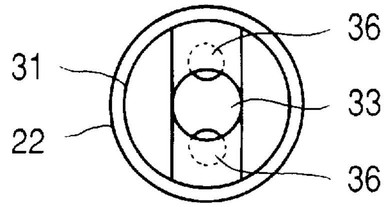
FIG. 7 is a top plan view, in part perspective, that illustrates the tool head portion and the tool shank portion of the tyre valve (core) mounting and dismounting tool shown in FIGS. 5A and 5B.
Figure 8:
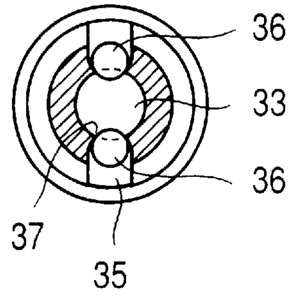
FIG. 8 is a cross sectional view of the tool head portion taken along the line VIII and as viewed from the direction of the arrow in FIG. 5A.
Figure 11A:
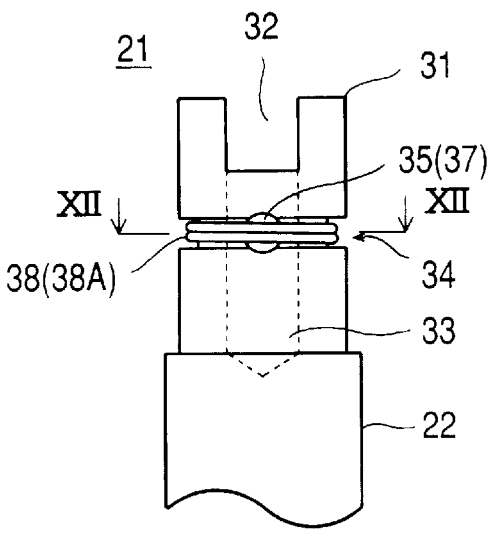
FIGS. 11A and 11B are an enlarged front and an enlarged side view, respectively, that illustrate a tool head portion extending from a tool shank portion in a preferred form of embodiment of the invention, of a tire valve (core) mounting and dismounting tool according to the present invention.
Figure 11B:
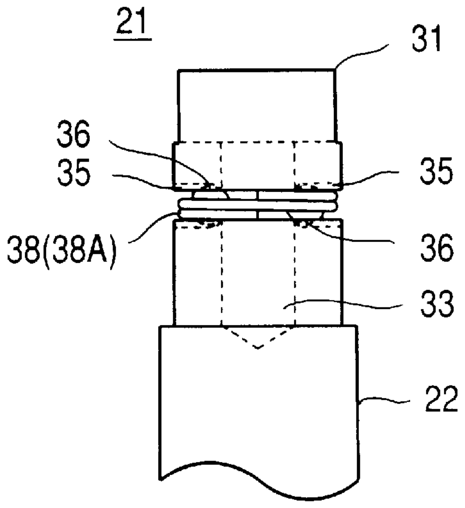
Figure 12:
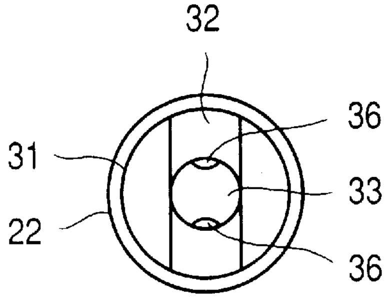
FIG. 12 is a view similar to that of FIG. 6.

FIGS. 5A and 5B through 10A and 10B show a first form of embodiment of the tool head portion 21 whereas FIGS. 11A and 11B through 14A and 14B show an alternative but preferred form of the tool head portion 21 of a tire valve (core) mounting and dismounting tool 20 according to the present invention. FIGS. 7 and 8 are common to the latter form of embodiment as well.

In both of these forms of embodiment of the invention as shown in FIGS. 5A to 14B, the tool head portion 21 is generally cylindrical with its periphery being round and is formed at its top or forward end 31 with a slot 32 that is adapted to seize and hold, in a snug fit, a valve core head portion 16 as previously described. The tool head portion 21 in these embodiments also has a cylindrical axial bore 33 formed coaxially of the tool head portion 21. The axial bore 33 has its inner wall smooth and is adapted to receive the said valve core shaft portion 14 and to accept the round enlarged shaft end 14*a* thereof in a snug fit. The axial bore 33 extends to and is thus open to the valve core head seizing and holding slot 32. The slot 32 is formed by cutting and the axial bore 33 by drilling.

The tool head portion 21 also has, below the slot 32 as shown, an annular recess or groove 34 formed along a peripheral surface of the tool head portion 21 so as to encircle the axial bore 33. A second bore or bores, a pair of bores 35 as shown are also formed in the tool head portion 21 so as to extend radially outwards thereof and to be open to the said annular groove 34 and spherical balls 36 are slidably received in these bores, respectively. Here, the second bores 35 are each individually in communication with the axial bore 33 through an opening 37 that may be circular and are each smaller in diameter than each spherical ball 36. Thus, as can be seen from FIG. 8, the bores 35 are shown to have each a cylindrical wall that commences at a portion of annular groove 34 and which as it approaches the axial bore 33 becomes spherical or is tapered spherically, ending with the circular opening 37 with a somewhat reduced diameter. Each of the bores 35 is so configured as to allow the ball 36 to slidably move in the bore 35 in its oriented radial direction, and the opening 37 is so sized not only to prevent the ball 36 from falling into the axial bore 33 but to allow the ball 36 in its innermost position to partially protrude out of the opening 37 into the axial bore 33 as shown diagrammatically in FIGS. 6, 7, 8 and 12. The annular groove 34 is formed by cutting and the ball reception bores 35 with their respective openings 37 by drilling or boring.

The two bores 35 are here disposed diametrically opposite to each other about a longitudinal axis 21A of the tool head portion 21.

Figure 9:
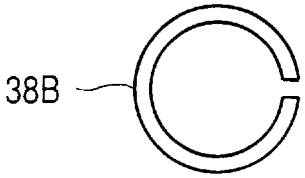
FIG. 9 is a top plan view that illustrates a ring or a single coil spring shown in FIGS. 5A and 5B.
Figure 13A:
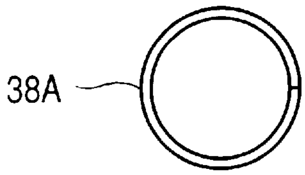
FIGS. 13A and 13B are a top plan view and a side view that illustrate a coil spring shown in FIGS. 11A and 11B.
Figure 13B:

The annular groove 34 is adapted to receive a spring 38 that can be a flat spring 38B in the form of character C as shown in FIG. 9 in the first embodiment. The spring 38 may alternatively and should more preferably be a coil spring 38A having a plurality of turns as shown in FIGS. 13A and 13B as adopted in the second embodiment. The number of turns is then selected from 2 to 4.

In FIGS. 5A and 5B and 11A and 11B the spring 38 is shown to have been anchored and fastened in the annular groove 34. The spring is so anchored and fastened after the balls 36 are put in their respective reception bores 37. The spring 38 acts to resiliently or elastically hold the balls 36 and to normally bias the balls 36 radially inwards of the cylindrical body portion of the tool head 21 to allow the balls 36 to be kept partially and somewhat protruding out of the respective ball retaining bores 35 into the axial bore 34 through the small opening 37.

An explanation is now given in respect of how a tire valve (core) mounting and dismounting tool according to the present invention.

With reference to FIGS. 10A and 10B and FIGS. 14A and 14A and 14B showing the first and second forms of embodiment of the present invention in which the spring means 38 is constituted by a flat C-shaped spring 38B and a coil spring 38A, respectively, a tyre valve core 12 is shown as being detached by the operator from its tubular casing 11 not shown but shown in FIG. 1.

Figure 10A:
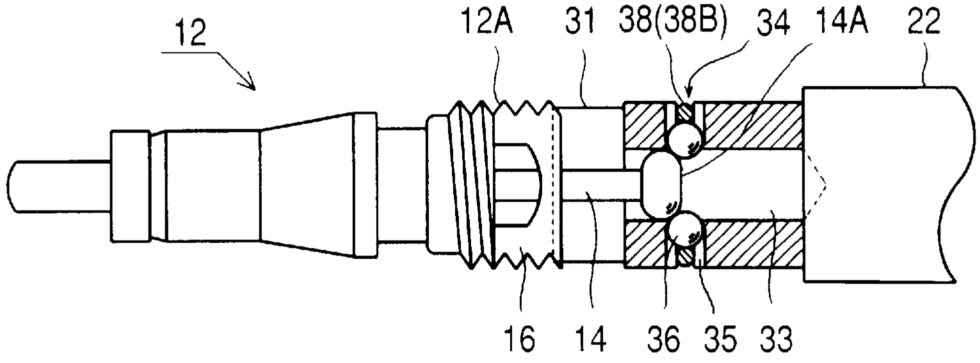
FIGS. 10A and 10B are side views, in part perspective and in part cross sectional, that illustrate the valve core and the tool with the head tool portion of FIGS. 5A and 5B in two successive stages of an operation of the tool, respectively.
Figure 10B:
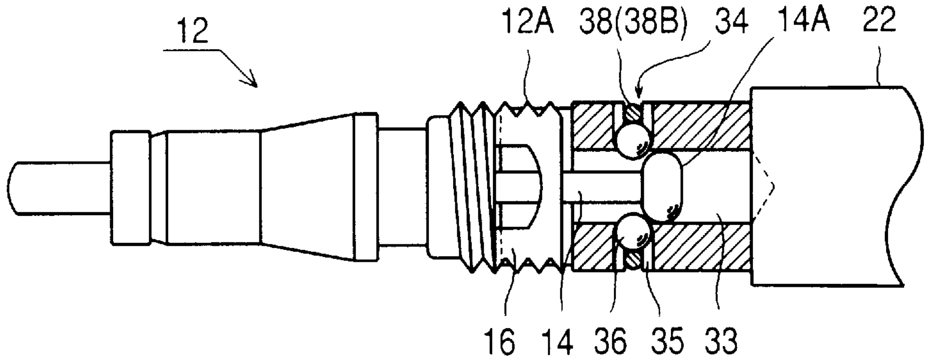
Figure 14A:
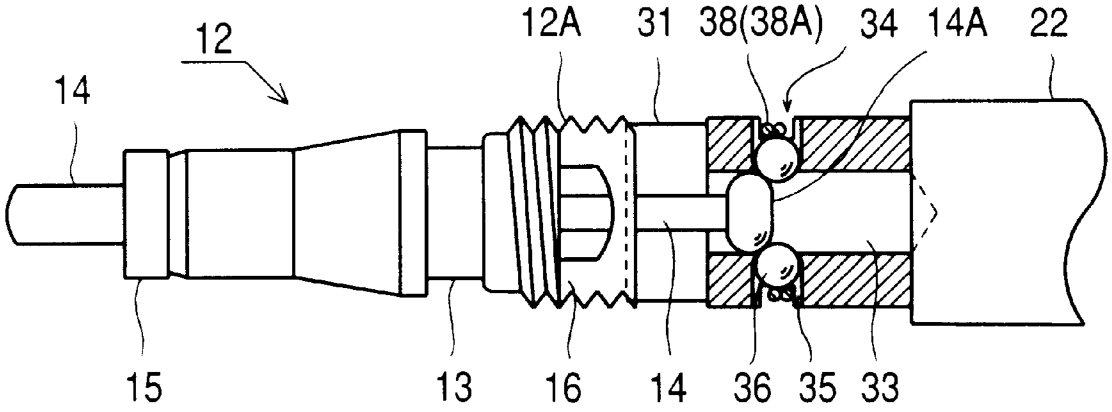
FIGS. 14A and 14B are side views, in part perspective and in part cross sectional, that illustrate the valve core and the tool with the head tool portion of FIGS. 11A and 11B in two successive stages of an operation of the tool, respectively.
Figure 14B:
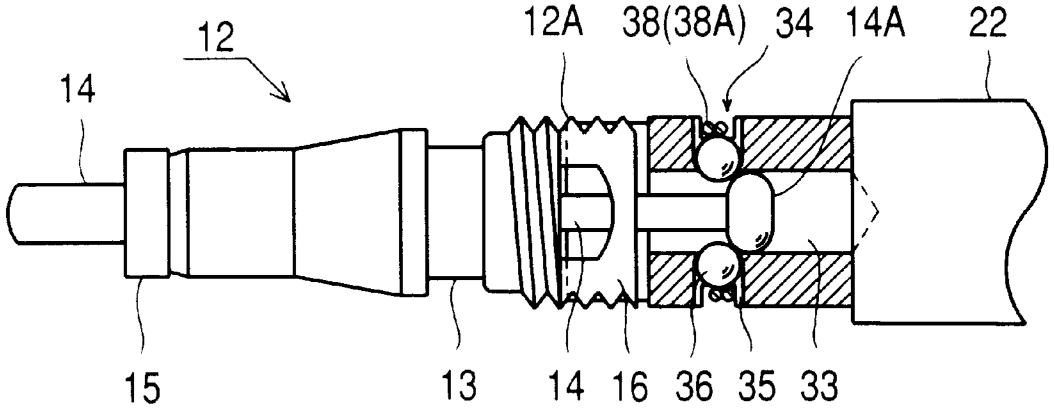

FIGS. 10A and 14A show in an enlarged cross section a state before the valve core 12 is not completely caught and accepted by the tool head portion 31. FIGS. 10B and 14B show in an enlarged cross section a state after the valve core 12 is caught and held by the tool head portion 31.

As shown in FIGS. 10A and 14A, the valve core head 16 lies slightly entering the seizing and holding slot 32 (FIGS. 5A and 11A) formed at the top or foremost end 31 of the tool head portion 31, and the enlarged round end 14*a* of the valve core shaft 14 lies somewhat entering the insertion inlet of the shaft accepting axial bore 33 and in contact with the balls 36 partially protruding from their respective ball accepting bores 35 through the respective openings 37 as mentioned before.

To establish this state, the operator may hold the tool 20 (FIGS. 4A and 4B) by holding its shank portion 22 between two fingers of his/her one hand and holding its grip portion 23 with these fingers and the thumb of the same hand, and may then engage the tool 20 so as to allow the valve core shaft and head portions 14 and 16 to move into the slot 32 and the enlarged round shaft end 14*a* to enter the axial bore 33. When the enlarged round shaft end 14*a* is felt to hit the balls 36, the state shown in FIGS. 10A and 14A will have been reached.

Then, applying a light thrust with the thumb to the tool grip portion 23 to force the tool head portion 21 (FIGS. 4A and 4B) against the valve core 12 screwed with its tubular casing 11 (FIG. 1) secured to the inflated tyre will cause the enlarged round shaft end 14*a* of the valve core shaft 14 to push the balls 36 and force the balls 36 to expand the spring means 38, the coil spring 38A or the flat C-shaped spring 38B. Thus, the spring means 38 is here designed to possess an elasticity that is adequate to permit the balls 36 that has partially come out of the bores 35, when they are pushed by the moving shaft end portion 14*a*, to be pushed thereby to move in the ball accepting bores 35 and completely out of the axial bore 33, and yet to be retained in the bores 35 by the spring means 38.

Such a push continued to the grip portion 23 will put the enlarged round end 14*a* of the shaft 14 deeper into the shaft accepting bores 35 and cause the balls 36 to be pushed back by the spring means 38 and thereby to come again to partially protrude into the shaft accepting axial bore 33. As a result of this, the valve core head portion 16 will fit completely in its sizing and holding slot 32, and the balls 36 that has protruded act to catch the enlarged shaft end 14*a* and to hold the valve core shaft portion 14 against moving back.

Turning counterclockwise the tool grip portion 23 in this state will allow the valve core 12 with its head portion held in the slot 32 of the tool head portion 21 also to turn, thus permitting the valve core 12 to be unscrewed and detached from the valve tubular casing 11 (FIG. 1) for replacement with a new valve core or mounting again. The valve core may then be detached from the tool 20 simply by applying a light pull between them.

The same valve core or a new valve core 12 may be mounted first by holding it with the other hand and holding the tool 20 as mentioned before. This time, the valve core 12 is engaged with the tool 20, and a thrust or push as mentioned before may be applied from the valve core 12 side to permit the valve core head portion 16 to be held by the slot 32 and the valve core shaft portion 14 and its enlarged end 14 to be caught in the axial bore 33 by the balls. Then, turning clockwise the tool 20 with its grip portion will allow the valve core 12 to be screwed with the tubular casing 11 within it.

After the valve core 12 is set in the tire, the operator may simply pull the tool 20 towards the operator to detach the tool head portion 21 and remove the tool 20 from the valve core 12 set in the valve.

Thus, both when a valve core 12 is removed from its tubular casing 11 in the tire and when a valve core 12 is mounted into the valve casing 11, the construction that allows both the valve core head head portion 12 and the valve core shaft portion 14 to be seized and held reliably prevents the valve core 12 from being blown away from the valve mounting and detaching tool 20 by a high pressure air flow momentarily flushed through the valve 10 from the tire, yet permitting both a mounting and a detachment operation to be performed easily and reliably with a single hand.

It has been found that a coil spring 38A as shown in FIGS. 13A and 13B and described before is preferred to a flat C-shaped spring as shown in FIGS. 6 and 9 because of highly superior durability to an increased air pressure burst and hence is much more desirable for tire air valves for automobiles such as commercial vehicles, motor buses, etc.

It should be noted that the tool shank portion 22, the valve core head portion 21, the balls 36 and the coil means 38 which make up the valve mounting and dismounting tool 20 are preferably made of a stainless alloy steel, but they may be made of any other suitable material or materials. Also, the shank portion 22 and the grip portion 23 may have optional lengths that can be selected to meet with particular type of tire or tires in which an applicable tire valve or valves are installed. They may also have optional sizes and machined dimensions without particular limitation that can be selected to meet with an applicable valve core or cores.

Industrial Applicability

As set forth in the foregoing description, using a valve core mounting and dismounting tool according to the present invention for dismounting and mounting a valve core that has been or is being screwed with a tire valve tubular casing mounted in the tire will, regardless of the type of a particular tire in which it is installed, allow the valve core to be seized and held by the valve core mounting and dismounting tool with a single hand, and with ease and with reliability even with one hand. Without the inconvenience that a valve core may come off from the tool and may then drop by gravity, its workability is drastically enhanced. Also, even in case its use is for a tire for a truck or commercial vehicle or a motor bus which entails a high air pressure burst, the likelihood that a valve core may be blown off by such a high pressure air blow and may then be lost is prevented. Indeed, the use of a coil spring in the present invention also makes the tool itself well endurable to high pressure air flows.

Although the present invention has been described in terms of the presently preferred embodiments, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A valve core mounting and dismounting tool for a tire air valve having a tubular casing mounted in a vehicle tire and a valve core which is screwed into the tubular casing to form the tire air valve and is unscrewed for removal from the tubular body and to dismount the tire air valve, the valve core having a valve core head portion and a valve core shaft portion that extends through and projects from the valve core head portion and has an enlarged shaft end, which tool comprises:

a tool head portion; a tool shank portion; and a tool grip portion, said tool head portion being formed at its top end with a slot for seizing and holding the valve core head portion in a snug fit, said tool head portion also having:

a substantially cylindrical axial bore formed coaxially of said tool head portion for receiving said valve core shaft portion and accepting said round enlarged shaft end thereof in a snug fit, said axial bore being open to said slot;

an annular recess formed along a substantially cylindrical peripheral surface of said tool head portion;

a second bore formed in said tool head portion so as to extend substantially radially outwards thereof and to be open to said annular recess, and a ball means slidably received in said bore, said second bore communicating with said axial bore through an opening that is smaller in diameter than said ball; and a spring means anchored and fastened in said annular groove for normally biasing said ball means substantially radially inwards of said tool head portion to hold said ball means partially protruding out of said second bore into said axial bore through said opening, said spring means having an elasticity sufficient to permit said ball means when pushed by the enlarged shaft end of said valve core shaft portion moving past said slot and inside of said axial bore to be pushed thereby outwards to move in said second bore and completely out of said axial bore and to be retained in said second bore by the spring means.

2. A tool as set forth in claim 1 in which the elasticity of said spring means is such as to allow the enlarged end of the valve core shaft portion to move deeper beyond said ball means and then to allow said ball means to restore its biased state as set forth and thereby to act to hold said enlarged shaft end against moving back.

3. A tool as set forth in claim 2 in which said second bore comprises a plurality of bores and said ball means comprises a plurality of substantially spherical balls each of which is accepted in each of said bores, respectively.

4. A tool as set forth in claim 3 in which said spring means comprises a spring in the form of a character C.

5. A tool as set forth in claim 3 in which said spring means comprises a coil spring.

6. A tool as set forth in claim 5 in which said coil spring has a number of turns selected from 2 to 4.

7. A tool as set forth in claim 4 or claim 5 in which said second bore comprises a pair of second bores disposed substantially diametrically opposite to each other about a longitudinal axis of said tool head portion, and said ball means comprises a pair of spherical balls which are accepted in said second bores, respectively.

* * * * *